(12) United States Patent
Kumar et al.

(10) Patent No.: US 6,328,056 B1
(45) Date of Patent: Dec. 11, 2001

(54) PROPORTIONAL BYPASS VALVE WITH DUAL VARIABLE ORIFICE

(75) Inventors: Abhay Kumar, Notre Dame; Paul W. Futa, Jr., North Liberty; Steven F. Fisher, South Bend, all of IN (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/626,179

(22) Filed: Jul. 27, 2000

Related U.S. Application Data

(63) Continuation-in-part of application No. 08/989,954, filed on Dec. 12, 1997, now Pat. No. 6,135,135.

(51) Int. Cl.⁷ .................................................. F16K 17/06
(52) U.S. Cl. .................................. 137/115.09; 137/484.2; 60/39.281
(58) Field of Search ........................ 137/115.03, 115.09, 137/115.21, 484.2; 60/39.281

(56) References Cited

U.S. PATENT DOCUMENTS

| | | | |
|---|---|---|---|
| 2,665,704 | * | 1/1954 | Kanuch ........................ 137/115.09 X |
| 4,361,166 | * | 11/1982 | Honaga et al. ................... 137/115.07 |
| 4,608,820 | * | 9/1986 | White et al. ....................... 60/39.281 |

* cited by examiner

Primary Examiner—Stephen M. Hepperle
(74) Attorney, Agent, or Firm—Larry J. Palguta

(57) ABSTRACT

An unbalance compensated bypass valve (14, 21, 23) for a gas turbine engine fuel supply system is responsive to the fuel pressure differential across a fuel metering valve (15) to open and close a bypass orifice (37, 39, 41; 89, 91, 93; 99, 101, 103). The bypass valve (14, 21, 23) selectively supplies high fuel pressure to a compensating cavity (45, 95, 120) providing a counterbalancing force against an annular area (47, 97, 124) of the bypass valve piston (34, 81, 83, 111, 112) to compensate for increased restorative forces of a helical reference spring (57, 112, 125) as that spring is collapsed as well as to compensate for other unbalance conditions within the valve (14, 21, 23). The compensating cavity may include a variable orifice inlet (37, 39, 41), (99, 101, 103), or (89, 91, 93) and a variable orifice outlet (105, 107, 109) or the inlet orifice may be variable while the outlet orifice (43, 96, 99) is fixed. The piston (34) or housing (100) may include additional sidewall openings (69, 70, 71) or (92, 94) which function during a "shut-off" condition to divert all fuel flow from the metering valve (15) inlet back to a fuel pump (13) inlet. The piston (34) may also include further sidewall openings (73, 75) which provide a controlled fuel leakage from a bypass valve inlet (25) to the bypass valve pressure sensing port (29).

25 Claims, 5 Drawing Sheets

PROPORTIONAL BYPASS VALVE WITH DUAL VARIABLE ORIFICE

This application is a continuation-in-part of application Ser. No. 08/989,954 entitled FORCE BALANCED PROPORTIONAL BYPASS VALVE and filed Dec. 12, 1997, now U.S. Pat. No. 6,135,135.

SUMMARY OF THE INVENTION

The present invention relates generally to methods and apparatus for fuel flow control and more particularly to a fuel bypass valve which diverts fuel from a fuel pump outlet in an attempt to maintain a constant pressure drop across a fuel metering valve located downstream of the fuel pump. In particular, the bypass valve of the present invention compensates for imbalances caused by changes in the fuel flow rate through the bypass valve or caused by the pressure drop across the bypass valve to more closely maintain the pressure differential across the metering valve constant.

In aircraft fuel control systems, it is common to control the head or pressure differential across a fuel system metering valve by diverting part of the output from a fuel pump back to the inlet of that fuel pump. In such known systems, the pressure differential across the metering valve may, for example, be applied to a spring loaded diaphragm. That diaphragm may be coupled to a bypass valve and if the pressure differential across the metering valve becomes too large, the diaphragm moves so as to open the bypass valve and spill some of the fuel from the outlet back to the pump inlet. Similar systems employing a spring-biased piston coupled to a bypass valve arrangement are also known. The mechanism which senses the pressure differential across the metering valve may be a separate component or may be an integral part of the bypass valve. With such known bypass valves, if the bypass orifice opens further to divert greater quantities of fuel, the piston or diaphragm must move against the force of the bias spring. The spring is deformed increasing its restorative force. When the piston or diaphragm again achieves equilibrium, the forces on opposite diaphragm or piston sides are again equal, but the pressure differential is not the same as it was since one of the pressures is now being supplemented by a greater spring force. Other factors such as Bernoulli forces created by the fuel flow may also contribute to this problem.

Thus, flow unbalance on the piston of a bypass valve increases as the quantity of flow returned to the pump inlet is increased. Also, the unbalance increases as the pressure drop across the bypass valve increases. These unbalance forces act to close the valve. In order to counteract these forces, the regulated pressure drop across the metering valve must increase resulting in an inaccurate control of metering head. It is highly desirable to minimize or eliminate the variations from constant metering valve head created by changes in bypass flow or bypass orifice pressure drop. The unbalance forces and their interaction vary significantly among different fuel control systems. A bypass valve design adaptable to a wide variety of different fuel control systems would also be highly desirable.

Matched flow grinding of the bypass valve components to direct the fuel flow along certain paths in an attempt to cause the fuel flow alone to compensate for such imbalance is known. Such measures have met with some success, but add significantly to the cost of a bypass valve.

More complex bypass valve configurations, such as providing a dual piston configuration with a pair of balanced high fuel pressure fuel inlets to either side of the low or return fuel outlet have also met with some success, but contribute significantly to the weight, complexity and cost of the bypass valve.

It would also be highly desirable to minimize or eliminate the variations from constant metering valve head created by changes in bypass flow or bypass orifice pressure drop without contributing significantly to the cost or weight of the bypass valve.

The present invention overcomes the prior problems and achieves the aforementioned goals by restricting the outlet area of a bypass valve downstream of the bypass ports thus creating an intermediate fuel pressure region between the two ports. This intermediate pressure is applied against an annular area of the piston and is opposed by the pump inlet pressure. As bypassed flow increases, the counterbalancing pressure increases. Proper sizing of the piston annulus and the outlet areas provides a force on the piston essentially equal to the flow unbalance, but in the opposite direction which eliminates most head shift. The piston annular area may be part of a compensating chamber or cavity having inlet and outlet orifices either or both of which may be of variable or fixed size. These orifices may comprise a plurality of openings which may be of varying shapes and spacing providing a wide latitude in design configurations.

In accordance with one form of the invention, a fuel bypass valve selectively diverts fuel from the outlet of the fuel pump back to the inlet of the fuel pump to maintain the fuel pressure differential between the inlet and the outlet of a variable orifice metering valve substantially constant. The valve provides a variable size bypass orifice and includes a movable piston for varying the size of the bypass orifice with the movable piston being urged in a direction to open the bypass orifice by high fuel pressure from the metering valve inlet and urged in a direction to close the bypass orifice by intermediate fuel pressure from the metering valve outlet. A supplemental fuel pressure compensating cavity provides a variable additional force urging the piston in a direction to increase the bypass flow. The cavity includes an annular region of the piston and augments the effect of the high fuel pressure to aid in moving the piston in the direction to open the bypass orifice. High fuel pressure is supplied to the cavity through a variable orifice inlet and applied to the annular region of the piston. Fuel exits the cavity through a variable orifice outlet. Orifice variation is caused by piston movement.

In accordance with another aspect of the invention, a bypass valve maintains a pressure differential between a high pressure source and a monitored intermediate pressure substantially constant and includes a valve housing having an inlet port adapted to be coupled to the high pressure source, an outlet port adapted to be coupled to a low pressure return, and a sensing port adapted to receive the intermediate pressure. A bypass flow path from the inlet port to the outlet port is controlled by a movable piston disposed within the valve housing for reciprocable motion along an axis. The piston has a pair of opposed faces and a hollow interior region. The hollow piston interior is coupled to the inlet port to supply high fuel pressure to one piston face. Low return pressure is applied to the other piston face. The bypass flow path includes a pressure responsive compensating cavity for providing a variable additional force urging the piston in a direction to allow the bypass flow, an inlet orifice, an outlet orifice, and a restricted flow path along a surface of the piston interconnecting the inlet orifice, outlet orifice and compensating cavity.

The present invention comprises a bypass valve for selectively diverting fluid from a high pressure source to a low pressure return for maintaining substantially constant a pressure differential between the high pressure of the source and a monitored intermediate pressure comprising a valve housing including an inlet adapted to be coupled to the high pressure source, an outlet adapted to be coupled to the low pressure return, and a sensing inlet adapted to receive the intermediate pressure. There is a movable piston disposed within the valve housing for reciprocable motion along an axis and having a pair of opposed faces. The piston has one extreme position allowing maximum flow of fluid from the high pressure source inlet to the outlet, another minimum flow extreme position substantially blocking any fluid flow from the high pressure source inlet to the outlet, and a range of intermediate positions allowing a controlled bypassing of fluid from the source to the return for maintaining the pressure differential substantially constant. High pressure fluid from the high pressure source inlet is applied to one piston face to urge the piston toward the one extreme position. Intermediate pressure fluid from the sensing inlet is applied to another piston face to urge the piston toward the equilibrium position and a spring within the housing engages and applies a variable force to the piston to urge the piston toward the equilibrium position. A compensating cavity including a counterbalancing force region associated with the piston has a variable orifice inlet and a variable orifice outlet for receiving a variable fluid pressure for supplying a variable counterbalancing force to the piston to urge the piston toward the one extreme position. The counterbalancing force typically increases as the piston moves toward the maximum flow extreme position, however, in another form, the counterbalancing force initially increases to compensate for the variable force applied to the piston by the spring as the piston moves toward the one extreme position and subsequently decreases as the piston moves further toward the one extreme position.

DESCRIPTION OF THE PREFERRED EMBODIMENT

Figure 1:
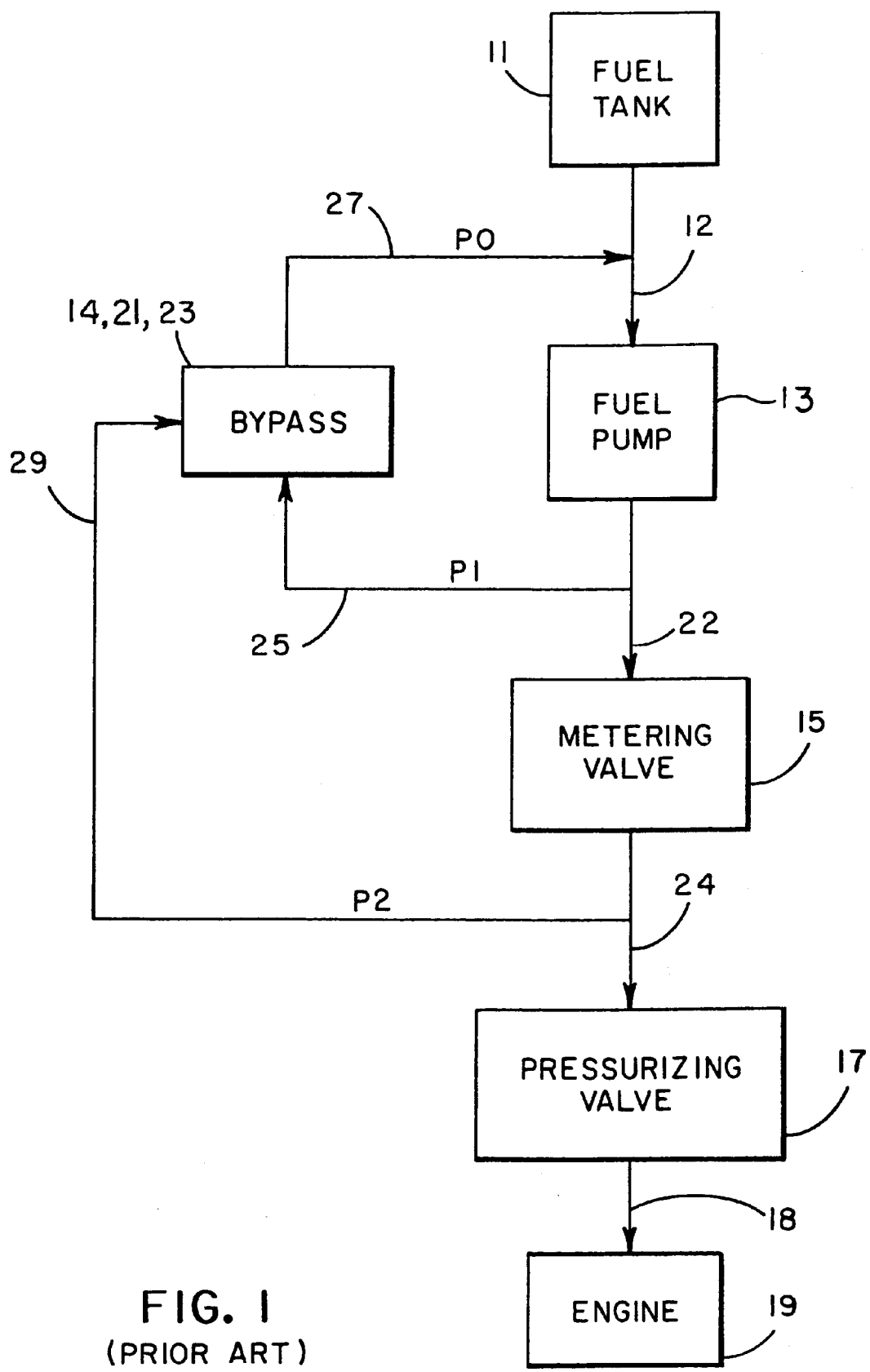
FIG. 1 is a schematic representation of an illustrative aircraft fuel system employing the bypass valve of the present invention.

Corresponding reference characters indicate corresponding parts throughout the several views of the drawing.

In FIG. 1, an illustrative aircraft fuel supply system includes a supply tank 11 from which fuel is fed by pump 13 to a variable orifice metering valve 15 and through a pressurizing valve 17 to an engine 19. The pressure differential or head P2–P1 is supplied to a bypass valve 23 by lines or inlets 25 and 29. The pressurizing valve 17 maintains a reference pressure level P2 on the downstream side 24 of the metering valve 15 so that the bypass valve 14, 21, 23 may selectively divert fuel from line 25 back through outlet or line 27 to the inlet or line 12 of the fuel pump 13 to maintain a constant head or pressure drop across the metering valve 15.

Figure 2:
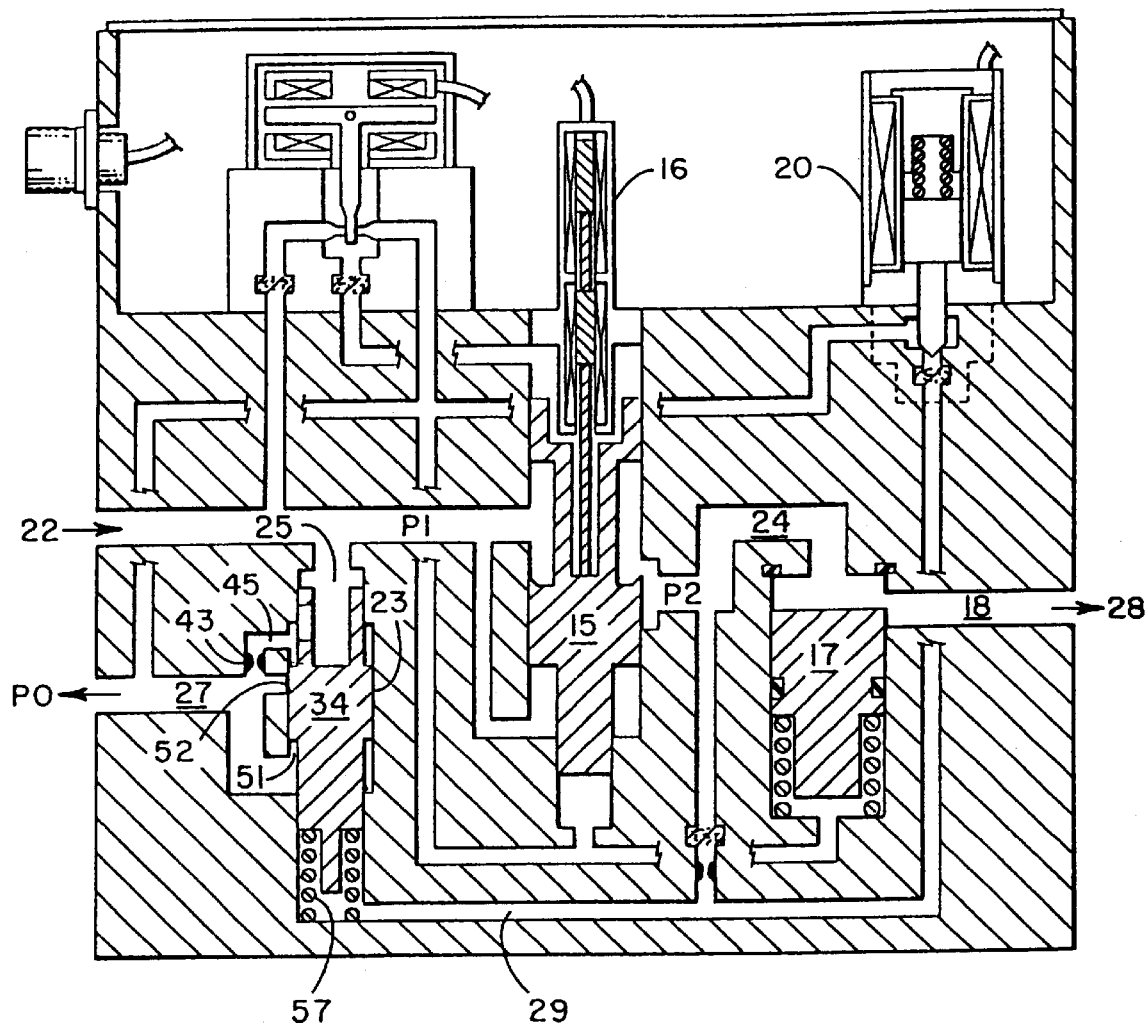
FIG. 2 is a more detailed schematic representation of a fuel metering unit incorporating the invention in one form.

A fuel control system incorporating the features of FIG. 1 is shown in FIG. 2. Here the incoming fuel at pump outlet or line 22 at pressure P1 passes to the metering valve 15. A sensor 16 provides an electrical indication of the metering valve orifice for control purposes. The metering valve outlet or line 24 supplies P2 pressure fuel to the pressurizing valve 17 and that fuel passes by way of line 18 to the engine 19 as indicated by arrow 28. P2 pressure fuel is also supplied by sensing line 29 to the bypass valve 23. The proportional bypass valve 14, 21, 23 diverts fuel back to low pressure return line 27 at pressure P0 to maintain the desired pressure differential across metering valve 15.

FIG. 2 also includes a shutoff/overspeed solenoid valve 20 shown in the "run" or closed position. In a "shut-off" condition, the solenoid valve 20 functions to vent P2 pressure from line 29 to P0 pressure and from one side of piston 34 of the bypass valve 14, 21, 23. High pressure P1 is still acting on the other face of piston 34 and the piston moves to the extreme open (downward as viewed in FIG. 2, rightward as viewed in FIG. 3) position allowing direct fuel flow from the hollow piston interior to the outlet port 52 by way of the piston sidewall aperture and to return line 27. In this position, P1 pressure in inlet line 25 is vented to P0 pressure, lowering P1 pressure to P0 pressure. This low P1 pressure condition causes pressurizing valve 17 to close, shutting off fuel flow through line 18 to the engine 19. The details of bypass valve 14, 21, 23 are better seen in FIGS. 3, 4 and 5.

Figure 3:
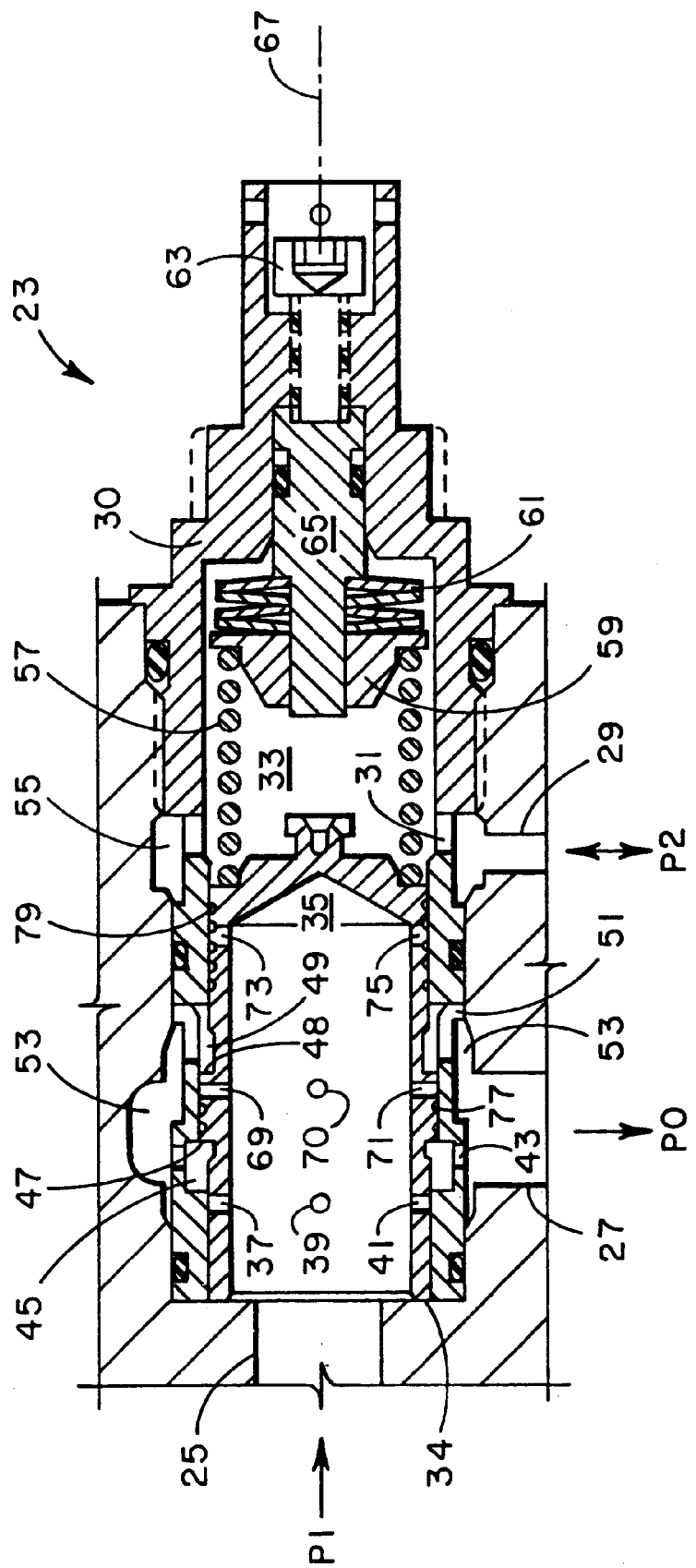
FIG. 3 is a cross-sectional view of one implementation of a displacement compensated proportional bypass valve.

In FIG. 3, bypass valve 23 comprises a valve housing 30 including an inlet line 25 which is adapted to be coupled to the high pressure P1 source. The housing includes first 53 and second 55 annular fluid flow paths surrounding the movable piston member 34. There is an outlet line 27 connected to the annular flow path 53 and adapted for low P0 pressure return. Finally, there is a sensing line 29 coupled to the annular flow path 55 and adapted to receive the intermediate pressure P2 from an outlet of the metering valve 15. A movable piston 34 is reciprocably supported in housing 30 for movement back and forth along axis 67 and has one piston face acted upon by pressure in cavity 33 while the other piston face receives pressure from cavity 35. In its leftmost position as viewed, the piston 34 substantially blocks any fuel flow from the inlet line 25 to the outlet line 27. In the rightmost piston position, fuel may flow freely through openings 69, 70 and 71 from the hollow piston interior 35, supplementing flow through openings 37, 39 and 41 that is restricted by orifice 43. The outward flow is through annular fluid flow path 53 and the return line 27. This extreme piston position corresponds to the "shut-off" condition discussed in conjunction with FIG. 2.

Piston 34 also has a range of intermediate positions in which high pressure fluid in the hollow piston interior 35 is applied to one piston face to urge the piston toward the extreme open position while intermediate pressure fluid in chamber 33 supplied from sensing line 29 by way of apertures such as 31 is applied to the opposite piston face to urge the piston toward the minimum flow, closed position, or no bypass condition. Since the fluid pressure force urging the piston toward the right or open extreme position is greater than the fuel pressure tending to close the valve, the piston 34 is also urged toward the left by a helical reference spring 57. Spring 57 is compressed between the piston 34 and a spring retainer 59. Retainer 59 is supported by an adjustment plug 65. The initial compression of the reference spring 57 is set by an adjustment screw 63. A bi-metal disk group 61 controls the spacing between retainer 59 and adjustment plug 65 and provides additional spring compression as the system warms to offset reductions in fuel specific gravity and loss of spring force due to heating. These intermediate piston positions allow a controlled bypassing of fluid from the source or inlet line 25 to the return or outlet line 27 for maintaining the pressure differential substantially constant.

Piston 34 has a hollow interior region or cavity 35 which communicates with the inlet line 25. The cavity 35 is essentially the interior of a cylindrical shell or piston skirt and includes a plurality of sidewall openings. The first set of openings 37, 39 and 41 cooperate with the annular fluid flow or counterbalancing force region 45 to define the bypass orifice. Note that there are actually several different holes forming this aperture. Hence, "aperture" or "orifice" as used herein includes single or multiple openings. The sidewall openings 37, 39 and 41 are staggered and of various sizes to achieve the desired variable size bypass orifice, dynamic response and bypass flow for a given application.

The piston skirt includes a second set of sidewall openings such as 73 and 75 which appear to be without purpose. There are a number of pressure balance grooves such as 77 and 79 in the piston periphery. Since the pressure in cavity 35 is slightly greater than that in cavity 33, there will be a slight leakage from apertures 73 and 75 by way of grooves such as 79 into cavity 33. This may be easily compensated for or calibrated out since the pressure difference is the desired constant pressure differential across the metering valve. Were these apertures absent, leakage would be from the relatively high variable pressure cavity 33 to the low pressure return annulus 53. This leakage would be uncontrolled and not easily compensated for.

The piston skirt includes a third set of sidewall openings 69, 70, 71 which are effective only in the wide open extreme position to provide a substantially unrestricted flow of fuel from the high pressure source or inlet line 25 to the low pressure return line or outlet port 27 by way of the annulus 49 and port 51.

As the bypass aperture opens further and bypass flow increases, spring 57 is compressed further and supplies a greater restorative force to the piston 34. Hence, the pressure differential between cavities 35 and 33 increases. To compensate for this and other unbalance conditions such as flow or Bernoulli forces, the counterbalancing force region 45 receives a variable fluid pressure for supplying a variable counterbalancing force to the piston 34 to urge the piston toward the extreme open position. The counterbalancing force varies to compensate for the variable force applied to the piston by the spring 57 as the piston moves. Thus, supplemental fuel pressure augments the rightward or opening force on piston 34 by applying a pressure to the annular region 45 within the bypass valve defined in part by an annular area 47 of the movable piston member 34. Annular region 45 has the bypass orifice 37, 39, 41 as an inlet and the flow restricting outlet including orifice 43 (which may comprise several openings) coupled to the fuel pump inlet by line 27. The flow restricting outlet is sized so that the supplemental or variable fuel pressure applied to the annular surface 47 is substantially the same as the low fuel pressure when the bypass orifice 37, 39, 41 is closed, and is somewhat above the low fuel pressure when the bypass orifice opens. P0 pressure is also applied to the annular surface 48 by way of annuli 49 and port 51. Since P0 is slightly below the pressure in the restricted outlet annular region 45, there is a net pressure differential augmenting the inlet pressure in chamber 35 and balancing the unbalance forces on the piston.

Figure 4:
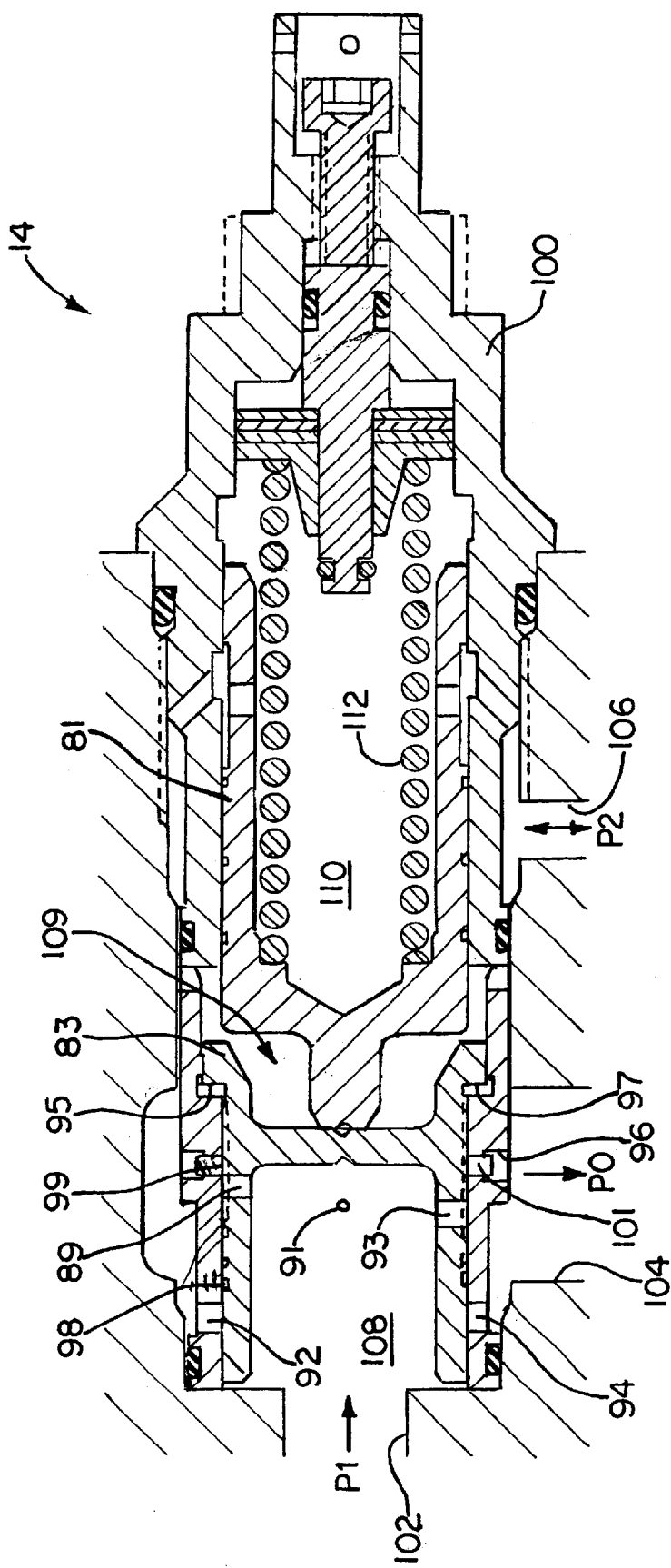
FIG. 4 is a cross-section of another implementation of a displacement compensated proportional bypass valve.
Figure 5:
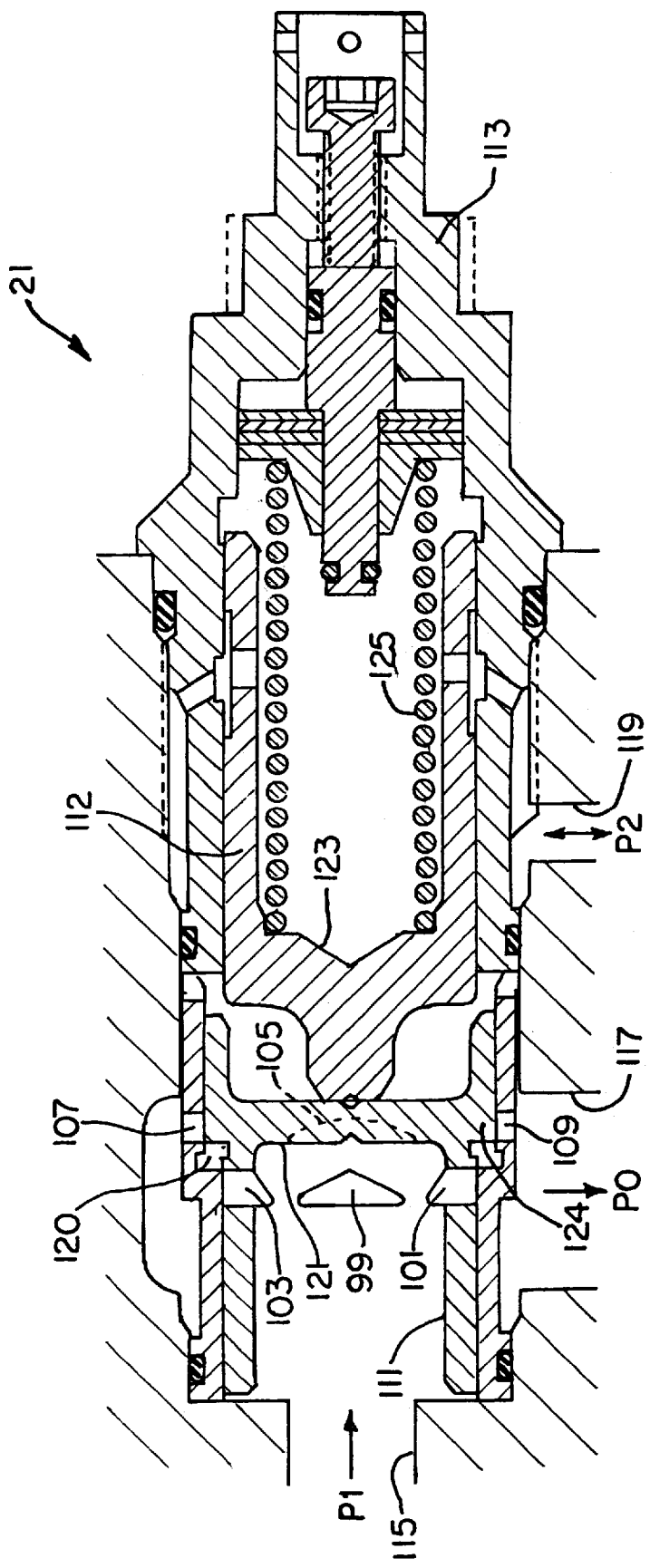
FIG. 5 is a cross-section of a further implementation of a displacement compensated proportional bypass valve.

A greater latitude in tailoring the variable counterbalancing force to specific fuel control applications is allowed by the modified proportional bypass valves 14 of FIGS. 4 and 21 of FIG. 5. In FIG. 4, the compensating force can be made to increase with increasing bypass flow up to a point and thereafter to decrease with further increasing bypass flow.

As in FIG. 3, the fuel bypass valve shown here has a variable flow bypass path including a movable member such as the two piece piston 81 and 83 for varying the bypass flow, the movable member is urged in a direction to increase the bypass flow by high fuel pressure from the metering valve inlet 22 and urged in a direction to reduce the bypass flow by intermediate fuel pressure from the metering valve outlet 24. The bypass flow path includes a pressure responsive compensating cavity 95 for receiving fuel at a pressure within the range of the fuel pressure differential between the inlet and the outlet of the metering valve and the compensating cavity provides a variable additional force urging the member in a direction to increase the bypass flow. Also as in FIG. 3, the fuel bypass valve includes a valve housing 100 including an inlet 102 coupled to the high pressure source, an outlet 104 connected to the low pressure return, and a sensing inlet 106 which receives the intermediate pressure. The housing contains a movable two piece piston disposed within the valve housing for reciprocable motion along an axis. The movable member or piston is formed as two piston portions 81 and 83 to simplify manufacturing and assembly. The two piston portions 81 and 83 remain coupled through all modes of operation as a result of high pressure in cavities 108 and 110, and low P0 pressure in area 109 between the two piston portions. The two piston portions move as a unit to vary the bypass flow. The piston has a hollow interior region or chamber 108 communicating with the high pressure source inlet and a chamber 110 communicating with intermediate pressure inlet 106. The piston has a pair of opposed faces within the cavities 108 and 110 and is urged against the bias of spring 112 in a direction to allow the bypass flow by high fuel pressure from the metering valve inlet supplied to the chamber 108. Cavity 108 receives high pressure from the high pressure source inlet 102 which is applied to one piston face to urge the piston toward the extreme open position while intermediate pressure fluid from the sensing inlet 106 is applied to another piston face within cavity 110 to urge the piston toward the position shown in FIG. 4 which is the minimum flow extreme position. Between these two extreme positions, there is a range of intermediate piston positions allowing a controlled bypassing of fluid from the source to the return for maintaining the pressure differential substantially constant.

In FIG. 4, there is a pressure responsive compensating cavity 95 which provides a variable additional force urging the piston in a direction to allow the bypass flow. Compensating cavity 95 is formed intermediate the piston and housing and there is a counterbalancing force region 97 therein associated with the piston. This region 97 receives a variable fluid pressure from intermediate annular region 101 by way of flow path 98 formed as a plurality of slots along a surface of the piston, and supplies a variable counterbalancing force to the piston to urge the piston toward the full bypass flow extreme position. The fuel bypass flow path includes an inlet orifice 89, 91 and 93, fixed outlet orifices 96 and 99 and an intermediate annular region 101. The inlet orifice is formed as a plurality (here four) of apertures in the sidewall or skirt of the piston. These apertures are of various sizes and various axial locations. Proper sizing and positioning of these apertures allows the counterbalancing force to initially increase to compensate for the variable force applied to the piston by the spring 112 as the piston moves toward the one or full bypass flow extreme position and to subsequently decrease as the piston moves further toward the one extreme position. The housing 100 includes the fixed outlet orifices 96 and 99 coupled to the annular region 101 communicating with the outlet 104. The fixed outlet orifices 96 and 99 are restrictions that act in series with the inlet orifices to maintain pressure in flow path 98 and compensating cavity 95. The sidewall openings 89, 91 and 93 and the width of annular region 101 cooperate to define a variable size inlet bypass orifice. In the rightmost piston position, fuel may flow freely through openings 92 and 94 from the interior of housing 100, supplementing flow through the variable size bypass orifice. This extreme piston position corresponds to the "shut-off" condition discussed in conjunction with FIG. 2.

In FIG. 5, there is a pressure responsive compensating cavity 120 which is controlled by both inlet openings and outlet openings which are variable in size. The pressure in compensating cavity 120 has a counterbalancing force region 124 therein associated with the piston, which provides a variable additional force urging the piston in a direction to allow the bypass flow. In contradistinction to FIGS. 3 and 4, the entire bypass flow here is through the compensating cavity. The bypass valve of FIG. 5 includes valve housing 113 having an inlet 115 coupled to the high pressure source P1, an outlet 117 coupled to the low pressure return P0, and a sensing inlet 119 which receives the intermediate pressure P2. A movable two-piece piston 111 and 112 has a pair of opposed faces 121 and 123 subjected to P1 and P2 respectively. P2 and bias or reference spring 125 urge the piston toward the minimum flow extreme position while P1 urges the piston toward the maximum flow position. The movable piston is again formed by two piston portions 111 and 112 for convenience of manufacturing and assembly and is disposed within the valve housing for reciprocable motion along an axis. There is one extreme piston position allowing maximum flow of fluid from the high pressure source inlet to the outlet and another minimum flow extreme position (the position illustrated in FIG. 5) substantially blocking any fluid flow from the high pressure source inlet to the outlet, and a range of intermediate positions allowing a controlled bypassing of fluid from the source to the return for maintaining the pressure differential substantially constant.

The piston 111 has a hollow interior region communicating with the high pressure source inlet 115 and includes a plurality of sidewall openings 99, 101 and 103 selectively connected to compensating cavity 120, and the housing includes a plurality of tapered sidewall openings 105, 107 and 109 selectively connecting the compensating cavity 120 to an inner annular housing region which in turn communicates with the outlet 117. The piston and variable sidewall openings cooperating to define a variable size bypass orifice.

The housing and tapered piston sidewall openings cooperate to define a compensating cavity inlet orifice with piston motion varying the inlet orifice, and the piston and housing sidewall openings cooperate to define a compensating cavity outlet orifice with piston motion varying that outlet orifice. With a variable orifice inlet 99, 101, 103 to the compensating cavity 120 and a variable orifice outlet 105, 107, 109 from the compensating cavity, the rate at which the inlet orifice varies increases as the movable member moves in a direction to increase the bypass flow and the rate at which the outlet orifice varies decreases as the movable member moves in a direction to increase the bypass flow. Since the narrow apex portion of the triangular inlet openings such as 99 opens first, the compensating flow starts out slowly and then increases more and more rapidly with increasing bypass flow. The outlet behaves in an opposite manner, beginning to open rapidly and then opening more and more slowly with increasing bypass flow. This is because the wide base portion of the triangular outlet openings such as 105 opens first. A wide variety of other aperture configurations allow a wide latitude of bypass flow patterns to suit particular fuel control systems.

What is claimed is:

1. A fuel control system for supplying fuel with low fuel pressure from a fuel supply to an inlet of a fuel pump and fuel with a high fuel pressure from an outlet of the fuel pump to an engine, comprising a variable orifice metering valve having an inlet for receiving high pressure fuel from the fuel pump outlet and an outlet for supplying fuel to the engine at a pressure intermediate the low and high fuel pressures and a fuel bypass valve for diverting selectively fuel from the outlet of the fuel pump back to the inlet of the fuel pump to maintain substantially constant a fuel pressure differential between the inlet and the outlet of the metering valve, the fuel bypass valve comprising a variable flow bypass path including a movable member for varying the bypass flow, the movable member being urged in a direction to increase the bypass flow by high fuel pressure from the metering valve inlet and urged in a direction to reduce the bypass flow by intermediate fuel pressure from the metering valve outlet, the bypass flow path including a pressure responsive compensating cavity having a variable orifice inlet and a variable orifice outlet, the compensating cavity providing a variable additional force urging the member in a direction to increase the bypass flow.

2. The fuel control system of claim 1, wherein the compensating cavity is formed in part by a portion of the movable member, the portion including a pressure surface responsive to pressure in the compensating cavity to provide the variable additional force.

3. The fuel control system of claim 1, wherein the rate at which the inlet orifice varies increases as the movable member moves in a direction to increase the bypass flow.

4. The fuel control system of claim 1, wherein the rate at which the outlet orifice varies decreases as the movable member moves in a direction to increase the bypass flow.

5. The fuel control system of claim 1, wherein the variable orifice inlet is coupled to the outlet of the fuel pump and the variable orifice outlet is coupled to the inlet of the fuel pump and all bypass fuel flow is through the variable orifice inlet and variable orifice outlet.

6. A fuel control system for supplying fuel with low fuel pressure from a fuel supply to an inlet of a fuel pump and fuel with a high fuel pressure from an outlet of the fuel pump to an engine, comprising a variable orifice metering valve having an inlet for receiving high pressure fuel from the fuel pump outlet and an outlet for supplying fuel to the engine at a pressure intermediate the low and high fuel pressures and a fuel bypass valve for diverting selectively fuel from the outlet of the fuel pump back to the inlet of the fuel pump to maintain substantially constant a fuel pressure differential between the inlet and the outlet of the metering valve, the fuel bypass valve comprising:

a variable flow bypass path including a movable member for varying the bypass flow, the movable member being urged in a direction to allow the bypass flow by high fuel pressure from the metering valve inlet and urged in a direction to prevent the bypass flow by intermediate fuel pressure from the metering valve outlet, the bypass flow path including a pressure responsive compensating cavity for providing a variable additional force urging the member in the direction to allow the bypass flow, a variable inlet orifice, a fixed outlet orifice, and an intermediate annular region connected to the compensating cavity by way of a flow path along a surface of the movable member interconnecting the variable inlet orifice, fixed outlet orifice, intermediate annular region and compensating cavity.

7. The fuel control system of claim 6, wherein the outlet orifice comprises a fixed orifice outlet.

8. The fuel control system of claim 6, wherein the bypass flow rate initially increases as the movable member moves in a direction to allow the bypass flow and subsequently decreases as the movable member continues to move in a direction to allow the bypass flow.

9. The fuel control system of claim 8, wherein the bypass flow rate finally increases to maximum as the movable member continues to move in a direction to allow the bypass flow.

10. A bypass valve for diverting selectively fluid from a high pressure source to a low pressure return for maintaining substantially constant a pressure differential between the high pressure of the source and a monitored intermediate pressure comprising:

a valve housing including an inlet adapted to be coupled to the high pressure source, an outlet adapted to be coupled to the low pressure return, and a sensing inlet adapted to receive the intermediate pressure;

a movable piston having a pair of opposed faces and disposed within the valve housing for reciprocable motion along an axis, the piston having one extreme position allowing maximum flow of fluid from the high pressure source inlet to the outlet, another minimum flow extreme position substantially blocking any fluid flow from the high pressure source inlet to the outlet, and a range of intermediate positions allowing a controlled bypassing of fluid from the source to the return for maintaining the pressure differential substantially constant;

means within the housing for supplying high pressure fluid from the high pressure source inlet to one piston face to urge the piston toward the one extreme position;

means within the housing for supplying intermediate pressure fluid from the sensing inlet to another piston face to urge the piston toward the minimum flow extreme position;

spring means within the housing engaging and applying a variable force to the piston to urge the piston toward the minimum flow extreme position; and a counterbalancing force region associated with the piston and receiving a variable fluid pressure for supplying a variable counterbalancing force to the piston to urge the piston toward the one extreme position, the counterbalancing force initially increasing to compensate for the variable force applied to the piston by the spring means as the piston moves toward the one extreme position and subsequently decreasing as the piston moves further toward the one extreme position.

11. The bypass valve of claim 10, for use in a fuel control system for supplying fuel from a fuel tank to an engine wherein the difference between high fuel pressure and monitored intermediate fuel pressure comprises the pressure differential across a variable orifice fuel metering valve.

12. The bypass valve of claim 10, wherein the counterbalancing force also varies to compensate for flow forces affecting the movable piston.

13. The bypass valve of claim 10, wherein the piston is effective only in the one extreme position to provide a substantially unrestricted flow of fluid from the high pressure source to the low pressure return.

14. The bypass valve of claim 10, wherein the piston has a hollow interior region communicating with the high pressure source inlet and includes a plurality of sidewall openings, intermediate annular region, and a plurality of flow slots along the piston surface, and the housing includes a fixed orifice coupled to an annular region communicating with the outlet, the sidewall openings, intermediate annular region and fixed orifice cooperating to define a variable size bypass orifice.

15. The bypass valve of claim 14, wherein at least one of the sidewall openings is smaller than another sidewall opening.

16. A bypass valve for diverting selectively fluid from a high pressure source to a low pressure return for maintaining substantially constant a pressure differential between the high pressure of the source and a monitored intermediate pressure comprising:

a valve housing including an inlet adapted to be coupled to the high pressure source, an outlet adapted to be coupled to the low pressure return, and a sensing inlet adapted to receive the intermediate pressure;

a movable piston having a pair of opposed faces and disposed within the valve housing for reciprocable motion along an axis, the piston having one extreme position allowing maximum flow of fluid from the high pressure source inlet to the outlet, another minimum flow extreme position substantially blocking any fluid flow from the high pressure source inlet to the outlet, and a range of intermediate positions allowing a controlled bypassing of fluid from the source to the return for maintaining the pressure differential substantially constant;

means within the housing for supplying high pressure fluid from the high pressure source inlet to one piston face to urge the piston toward the one extreme position;

means within the housing for supplying intermediate pressure fluid from the sensing inlet to another piston face to urge the piston toward the minimum flow extreme position;

spring means within the housing engaging and applying a variable force to the piston to urge the piston toward the minimum flow extreme position; and a compensating cavity including a counterbalancing force region associated with the piston, the cavity having a variable orifice inlet and a variable orifice outlet and receiving a variable fluid pressure for supplying a variable counterbalancing force to the piston to urge the piston toward the one extreme position.

17. The bypass valve of claim 16, for use in a fuel control system for supplying fuel from a fuel tank to an engine wherein the difference between high fuel pressure and monitored intermediate fuel pressure comprises the pressure differential across a variable orifice fuel metering valve.

18. The bypass valve of claim 16, wherein the piston has a hollow interior region communicating with the high pressure source inlet and includes a plurality of tapered sidewall openings selectively connected to the compensating cavity, and the housing includes a plurality of tapered sidewall openings selectively connecting the compensating cavity to an inner annular housing region which in turn communicates with the outlet, the piston and variable sidewall openings cooperating to define a variable size bypass orifice.

19. The bypass valve of claim 18, the housing and tapered piston sidewall openings cooperate to define a compensating cavity inlet orifice and the piston and tapered housing sidewall openings cooperate to define a compensating cavity outlet orifice.

20. The bypass valve of claim 19, wherein the rate at which the inlet orifice varies increases as the piston moves toward the one extreme position.

21. The bypass valve of claim 19, wherein the rate at which the outlet orifice varies decreases as the movable member moves toward the one extreme position.

22. The bypass valve of claim 16, wherein the counterbalancing force also varies to compensate for flow forces affecting the movable piston.

23. A fuel control system for supplying fuel with low fuel pressure from a fuel supply to an inlet of a fuel pump and fuel with a high fuel pressure from an outlet of the fuel pump to an engine, comprising a variable orifice metering valve having an inlet for receiving high pressure fuel from the fuel pump outlet and an outlet for supplying fuel to the engine at a pressure intermediate the low and high fuel pressures and a fuel bypass valve for diverting selectively fuel from the outlet of the fuel pump back to the inlet of the fuel pump to maintain substantially constant a fuel pressure differential between the inlet and the outlet of the metering valve, the fuel bypass valve comprising a flow path connecting a compensating cavity to an intermediate annular region, a variable flow bypass path including a movable member for varying the bypass flow, the movable member being urged in a direction to increase the bypass flow by high fuel pressure from the metering valve inlet and urged in a direction to reduce the bypass flow by intermediate fuel pressure from the metering valve outlet, the bypass flow path including a pressure responsive compensating cavity for receiving fuel at a pressure within the range of the fuel pressure differential between the inlet and the outlet of the metering valve, the compensating cavity providing a variable additional force urging the member in a direction to increase the bypass flow.

24. The fuel control system of claim 23 further comprising a variable orifice inlet to the compensating cavity, a variable orifice outlet from the compensating cavity wherein the rate at which the inlet orifice varies increases as the movable member moves in a direction to increase the bypass flow and the rate at which the outlet orifice varies decreases as the movable member moves in a direction to increase the bypass flow.

25. The fuel control system of claim 23, further comprising an inlet orifice, an outlet orifice, an intermediate annular region, and a flow path along a surface of the movable member interconnecting the inlet orifice, outlet orifice, intermediate annular region and compensating cavity.

\* \* \* \* \*